United States Patent [19]
Helguera

[11] 3,746,205
[45] July 17, 1973

[54] THERMIC POT
[76] Inventor: Andres R. Helguera, Adolfo Prieto 9, Mexico, Mexico
[22] Filed: Feb. 25, 1971
[21] Appl. No.: 118,648

[30] Foreign Application Priority Data
July 30, 1970  Mexico .............................. 121,171

[52] U.S. Cl .................... 220/13, 126/376, 126/377, 220/55 PC
[51] Int. Cl. ........................................... A47j 27/10
[58] Field of Search ...................... 220/13, 17, 55 P, 220/55 C; 126/377, 376; 99/1

[56] References Cited
UNITED STATES PATENTS
| | | | |
|---|---|---|---|
| 222,838 | 12/1879 | Patterson | 126/377 |
| 1,290,378 | 1/1919 | Sibley | 220/17 |
| 2,637,459 | 5/1953 | Jordan | 220/13 |

Primary Examiner—Samuel B. Rothberg
Assistant Examiner—James R. Garrett
Attorney—Waters, Roditi, Schwartz & Nissen

[57] ABSTRACT

A container for use in cooking by means of steam or steam under pressure, said container comprising an inside vessel disposed within an outside shell in spaced relation thereto, said vessel and shell being fluid tightly connected together at their upper edges and forming therebetween a sealed chamber, an inlet opening into said chamber adjacent the upper edge of said shell, said inlet being closed by a removable stopper, a cover clampingly secured across the top of the vessel and provided with an aperture therein which aperture is sealed by a pressure stopper, said vessel and shell being provided with a two way valve means capable of venting the chamber to either the outside atmosphere or to the inside of the vessel.

4 Claims, 5 Drawing Figures

THERMIC POT

BACKGROUND OF THE INVENTION

The present application is, in general terms, related to culinary items, and more specifically refers to improvements in a thermic pot for cooking by means of steam or steam under pressure. This invention must be considered as an improvement to the thermic pot discussed in my Mexican Pat. No. 68,868 dated June 16th 1959, which refers exclusively to a thermic pot able to preserve for a long period of time and even to raise the temperature of several items contained therein, such as "tortillas" or any other item, without direct contact with water or any liquid, which at the time is contained in a space formed by a twin bottom of the container, or may be preheated or otherwise warmed by the time of its utilization.

Up to date, it has been necessary to count on different items with the purpose of keeping foods warm, cooking under steam or steam under pressure, which results in heavier expenses by the user and the need of a larger storage space.

BRIEF SUMMARY OF THE INVENTION

Is the object of this application to provide a single device for cooking purposes in which the aforementioned functions may be advantageously combined, that is, the device can be operated alternatively as a thermic pot under pressure or as a steam bowl able to cook in it conveniently the various foods, depending on the needs of the user; which obviously diminishes the expenses and results in an improved basic commodity with a better yield and which can be easily operated. On the other hand, the functioning conversion of this device is extremely easy, and consists only in manipulating a pin or bolt.

The thermic pot to which this invention is referred consists, the same way as the corresponding of my Mexican Pat. No. 68,868, of a double wall container with a common upper edge or border in which sidewalls and bottom of the both mentioned containers are formed to provide a space capable of keeping a liquid such as water or the like that has been heated previously or otherwise at the time of its utilization. This pot further includes a valve that allows the steam formed in the chamber or aforementioned space to egress; nevertheless, and in which the valve forms the improvement of the invention over the earlier Mexican patent which allows a wider utilization of the invention. The outer wall of the pot includes a hole or inlet for storing liquid in the space between the two walls of the container, and the inlet is provided with a pressure stopper made of thermoplastic material or the like that can be easily removed. The container also includes a cover that in case of operation under pressure, must be provided with some sort of clamps or fasteners which will keep the cover firmly in its place, and the cover must also be provided with a stopper acting as a protection against overpressure.

The outlet steam valve which is in essence the object of the present application, consists of a piston which may be hand operated, and which extends through a pair of aligned drill holes extending perpendicular to the container walls, and sealed with elastomeric ring seals.

The aforementioned piston includes two diametrically oblique bores extending parallel to each other and spaced in such a manner so as to form by means of the two extreme operative piston positions, a two way valve which when in an underpressure inward position, allows the steam flow formed within the chamber between the two walls in the container to cook under steam or steam under pressure, and when the piston is located in an outwardly extending position, the steam formed in the aforementioned chamber is permitted to exist to the exterior of the pot, leaving the pot free of the resulting increasing pressure generated within the chamber located between the two walls, so as to act simply as a thermic pot for keeping the contents warm.

These and further objects to be realized in the practice of the present application will be better understood and widely appreciated by means of the following description having reference to the accompanying drawings of the preferred embodiment.

DETAILED DESCRIPTION OF THE DRAWINGS

DETAILED DESCRIPTION OF THE INVENTION

Figure 1:
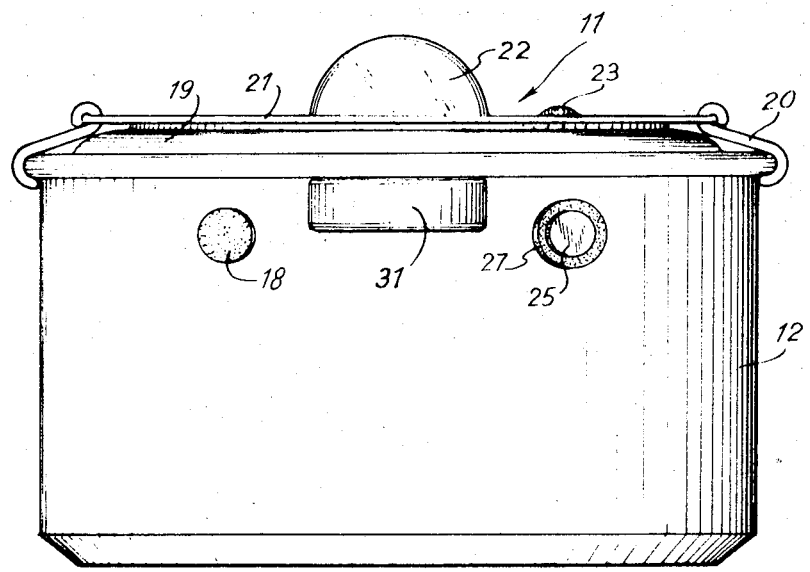
FIG. 1 is a vertical elevational view of the improved thermic pot according to the invention.
Figure 2:
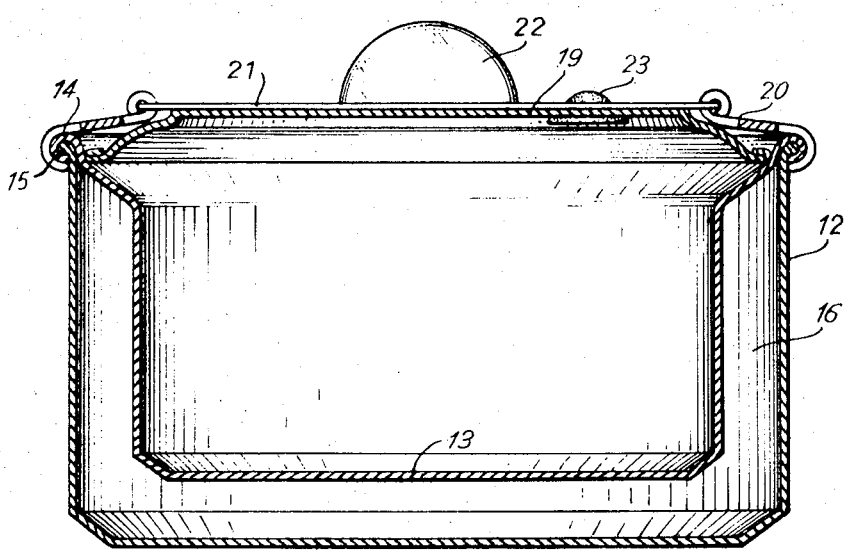
FIG. 2 is a longitudinal section view of the improved thermic pot of FIG. 1.
Figure 3:
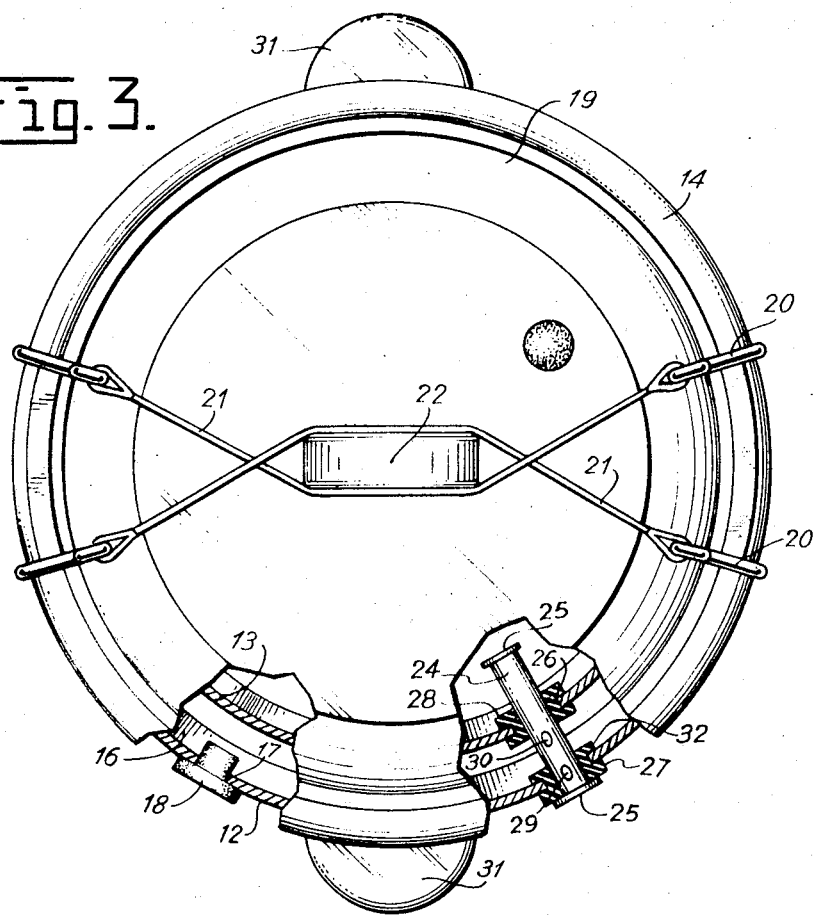
FIG. 3 is a top plane view partially in cross section of the improved thermic pot of FIG. 1.

The thermic pot 11 for cooking by means of steam or steam under pressure consists of a double wall container, having an outer wall 12, with lifting handles 31, and inner wall 13, the upper edge 14 of which is coupled fluid tightly to the edge 15 of the outer container wall surrounding it. A chamber 16 is formed between the two walls of the aforementioned container, and toward the upper section of the wall 12 of the container there is provided a drill hole 17 that constitutes an inlet for letting in some preheated liquid or liquid which is to be heated therein. The inlet 17 may be sealed hermetically by means of an elastomeric stopper 18. A cover 19 is positioned over the edge 14 of the container, and may be fastened thereto by clamps or hooks 20, and may include tension members 21 extending diametrically opposite so as to surround a handle 22 which facilitates operation of the cover. The cover further may include a small stopper 23 which seals, under pressure, a hole in the cover, as a safety valve against overpressure in the pot.

Figure 4:
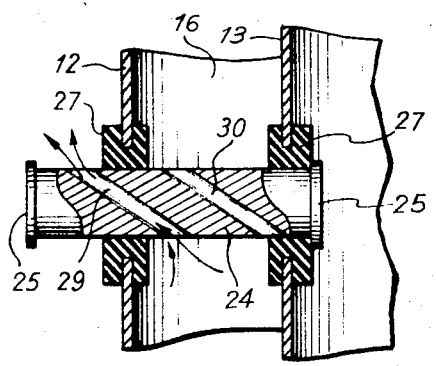
FIGS. 4 and 5 are detailed views in cross sections illustrative of the selective valve of the improved thermic pot to which this application refers, shown in a working position as a steam pot or as a pot under pressure.
Figure 5:
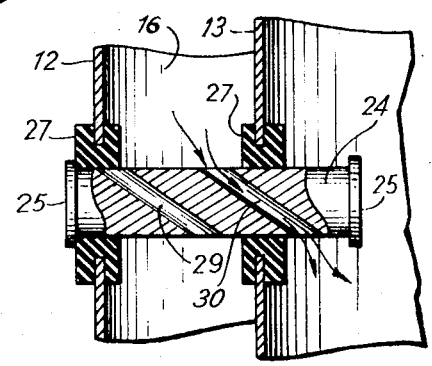

The most important aspect of the invention consists of in a two way change over valve which allows the device to operate either as a thermic pot or as a steam bowl. The valve consists of a single piston 24 having an appropriate length which slides through a pair of aligned drill holes extending perpendicular to the longitudinal axis of the pot, in effect, drill holes 26 and 32, formed in the walls 12 and 13 of the container, which drill holes are sealed or splayed by means of elastomeric ring seals 27 and 28 so as to hermetically seal the chamber 16. The piston rod 24 includes two bumpers or stops 25 at the ends thereof so as to limit the extent of its travel. Two oblique bores 29 and 30 extend parallel to each other and are spaced at such a slant that when the piston rod 24 is in its outward position into which it has been previously manually set, the steam inside the chamber 16 is allowed to escape through the bore 29, as shown in FIG. 4, toward the exterior, so as to provide operation as a thermic pot, and when the mentioned piston rod 24 is pressed by its outer bumper to its innermost position, the steam contained in chamber 16 flows through the conduit or bore 30, as illustrated in FIG. 5, toward the interior of the container, making it work as a steam pot or under steam pressure pot.

Although the above specification has been described with respect to a specific embodiment of the invention, it is to be considered by all those skilled in the art that all the aforementioned and any other change in form and detail are within the scope and spirit of the invention.

I claim:

1. A thermic pot for cooking by means of steam or steam under pressure, comprising a double wall container, said walls being coupled along their upper edges and forming therebetween a space adapted to contain liquid, the outer wall of said container including an inlet for said liquid, a removable stopper being positioned in said inlet for pressure sealing thereof; a cover being positioned on said container wall edge, diametrically opposite clamp and hook means connected to tension members for fastening said cover to said container; a handle formed at the central part of the cover and adapted to be surrounded by said tension members, a pressure stopper positioned in a hole in said cover providing excess pressure relief valve means; a two-way valve mounted on said container, said valve comprising a piston rod extending through a pair of aligned bores formed in said double walls and extending perpendicular to the vertical axis of the pot, elastomeric sealing bearings positioned on said bores and engaging said piston rod, said piston rod having movement-limiting bumpers at both ends thereof to restrict motion thereof into and out of said pot, said piston rod having two parallel spaced oblique bores diametrically extending therethrough so as to permit flow of steam through said piston rod.

2. A thermic pot as claimed in claim 1, said piston rod in the innermost position thereof providing through one of said oblique bores, communication between the space intermediate the walls of the container and the interior of the pot.

3. A thermic pot as claimed in claim 1, said further characterized piston rod in the outermost position thereof providing, through one of said oblique bores, communication between the space intermediate the walls of the container and the exterior of the pot.

4. A thermic pot, as claimed in claim 1, said piston rod being manually operable.

* * * * *